(12) United States Patent
Mane et al.

(10) Patent No.: US 11,544,534 B2
(45) Date of Patent: Jan. 3, 2023

(54) SYSTEMS AND METHODS FOR GENERATING RECOMMENDATIONS USING NEURAL NETWORK AND MACHINE LEARNING TECHNIQUES

(71) Applicant: Walmart Apollo, LLC, Bentonville, AR (US)

(72) Inventors: Mansi Ranjit Mane, Sunnyvale, CA (US); Anirudha Sundaresan, Sunnyvale, CA (US); Stephen Dean Guo, Saratoga, CA (US); Aditya Mantha, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 376 days.

(21) Appl. No.: 16/779,273

(22) Filed: Jan. 31, 2020

(65) Prior Publication Data

US 2021/0056385 A1 Feb. 25, 2021

Related U.S. Application Data

(63) Continuation-in-part of application No. 16/779,133, filed on Jan. 31, 2020, now Pat. No. 11,416,908.
(Continued)

(51) Int. Cl.
*G06Q 30/00* (2012.01)
*G06N 3/04* (2006.01)
(Continued)

(52) U.S. Cl.
CPC ............ *G06N 3/0454* (2013.01); *G06N 3/08* (2013.01); *G06Q 30/0631* (2013.01)

(58) Field of Classification Search
None
See application file for complete search history.

(56) References Cited

U.S. PATENT DOCUMENTS

| 7,809,601 | B2 | 10/2010 | Shaya et al. |
| 8,032,469 | B2 | 10/2011 | Atallah |
| (Continued) | | | |

FOREIGN PATENT DOCUMENTS

| WO | 2002033628 | 4/2002 |
| WO | 2017203262 | 11/2017 |

OTHER PUBLICATIONS

Cheng et al., "Wide & Deep Learning for Recommender Systems," Proceedings of the 1st Workshop on Deep Learning for Recommender Systems, 2016, arXiv:1606.07792v2 [cs.LG], arXiv.org > cs > arXiv:1606.07792, Jun. 24, 2016.
(Continued)

*Primary Examiner* — Mila Airapetian
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform: receiving an input identifying an anchor item; determining, using a quadruplet network associated with a neural network architecture, one or more item categories corresponding to complementary items associated with the anchor item; generating, using a ranking network associated with the neural network architecture, scores for the complementary items included in the one or more item categories; generating, using the ranking network associated with the neural network architecture, first ranking results for the complementary items based, at least in part, on the scores; and selecting one or more of the complemen-
(Continued)

tary items to be displayed based, at least in part, on the first ranking results. Other embodiments are disclosed herein.

20 Claims, 8 Drawing Sheets

Related U.S. Application Data

(60) Provisional application No. 62/891,145, filed on Aug. 23, 2019.

(51) Int. Cl.
*G06Q 30/06* (2012.01)
*G06N 3/08* (2006.01)

(56) References Cited

U.S. PATENT DOCUMENTS

| | | | |
|---|---|---|---|
| 8,290,818 B1 | 10/2012 | Levitan et al. | |
| 8,301,623 B2 * | 10/2012 | Chakrabarti | G06F 16/9535 707/723 |
| 9,595,053 B1 | 3/2017 | Cunico et al. | |
| 10,776,626 B1 * | 9/2020 | Lin | G06V 10/82 |
| 11,282,124 B1 * | 3/2022 | Yoon | G06Q 30/0631 |
| 2014/0136362 A1 | 5/2014 | Shaya et al. | |
| 2017/0124628 A1 | 5/2017 | Kirkby et al. | |
| 2017/0193582 A1 * | 7/2017 | Guo | G06Q 30/0633 |
| 2018/0218428 A1 * | 8/2018 | Xie | G06N 20/00 |

OTHER PUBLICATIONS

Cer et al., "Universal Sentence Encoder," arXiv:1803.11175v2 [cs.CL], arXiv.org > cs > arXiv:1803.11175, Apr. 12, 2018.

Veit et al., "Learning Visual Clothing Style with Heterogeneous Dyadic Co-Occurrences," Proceedings of the IEEE International Conference on Computer Vision, https://doi.org/10.1109/ICCV.2015. 527, 2015.

Zhang et al., "Quality-Aware Neural Complementary Item Recommendation," RecSys '18, Proceedings of the 12th ACM Conference on Recommender Systems, ACM, https://doi.org/10.1145/3240323. 3240368, Oct. 2-7, 2018.

* cited by examiner

SYSTEMS AND METHODS FOR GENERATING RECOMMENDATIONS USING NEURAL NETWORK AND MACHINE LEARNING TECHNIQUES

CROSS-REFERENCE TO RELATED APPLICATIONS

This application is a continuation in part of U.S. patent application Ser. No. 16/779,133 filed on Jan. 31, 2020, which claims the benefit of U.S. Provisional Application No. 62/891,145 filed on Aug. 23, 2019, both of which are herein incorporated by this reference in their entirety.

TECHNICAL FIELD

This disclosure relates generally to systems and methods for generating item recommendations using neural network and machine learning techniques.

BACKGROUND

In various scenarios, electronic platforms enable users to browse, view, purchase, and/or order items corresponding to various products and services. Electronic platforms can provide users with recommendations for items while they are accessing the electronic platform. However, providing appropriate recommendations can be technically challenging in scenarios where electronic platforms offer large quantities (e.g., thousands, hundreds of thousands, or millions) of items. One technical problem involves accurately identifying items with high relevance within large datasets maintained by the electronic platforms. Another technical problem relates to providing recommendations in a quick and efficient manner so that recommendations are provided to users in real-time or near real-time as they are accessing the electronic platform.

BRIEF DESCRIPTION OF THE DRAWINGS

To facilitate further description of the embodiments, the following drawings are provided in which.

Figure 1:
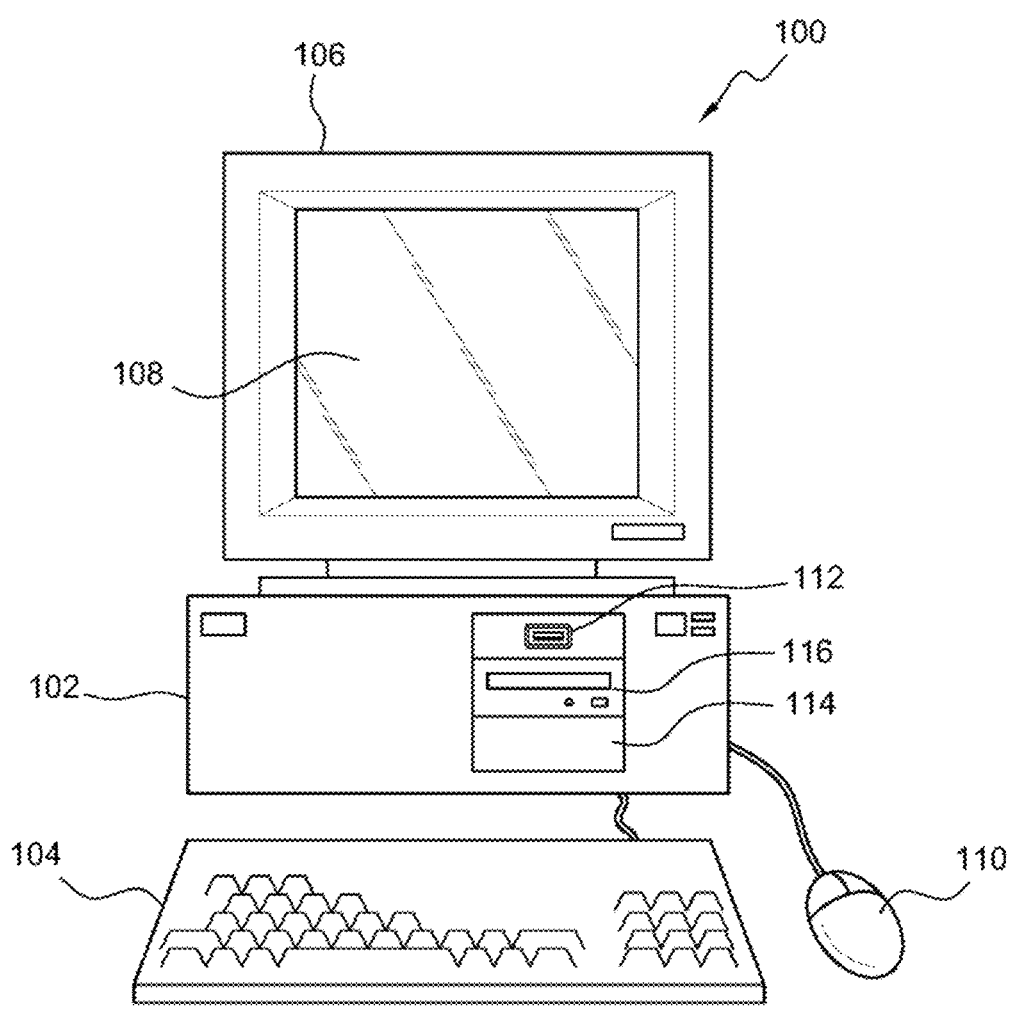
FIG. 1 illustrates a front elevational view of a computer system that is suitable for implementing various embodiments of the systems, architectures, and methods disclosed in FIGS. 3-8.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving an input identifying an anchor item; determining, using a quadruplet network associated with a neural network architecture, one or more item categories corresponding to complementary items associated with the anchor item; generating, using a ranking network associated with the neural network architecture, scores for the complementary items included in the one or more item categories; generating, using the ranking network associated with the neural network architecture, first ranking results for the complementary items based, at least in part, on the scores; and selecting one or more of the complementary items to be displayed based, at least in part, on the first ranking results.

Various embodiments include a method. The method can be implemented via execution of computing instructions configured to run at one or more processors and configured to be stored at non-transitory computer-readable media. The method can comprise: receiving an input identifying an anchor item; determining, using a quadruplet network associated with a neural network architecture, one or more item categories corresponding to complementary items associated with the anchor item; generating, using a ranking network associated with the neural network architecture, scores for the complementary items included in the one or more item categories; generating, using the ranking network associated with the neural network architecture, first ranking results for the complementary items based, at least in part, on the scores; and selecting one or more of the complementary items to be displayed based, at least in part, on the first ranking results.

Various embodiments include a computer program product. The computer program product can include a non-transitory computer-readable medium including instructions for causing a computer to: receive an input identifying an anchor item; determine, using a quadruplet network associated with a neural network architecture, one or more item categories corresponding to complementary items associated with the anchor item; generate, using a ranking network associated with the neural network architecture, scores for the complementary items included in the one or more item categories; generate, using the ranking network associated with the neural network architecture, first ranking results for the complementary items based, at least in part, on the scores; and select one or more of the complementary items to be displayed based, at least in part, on the first ranking results.

Figure 2:
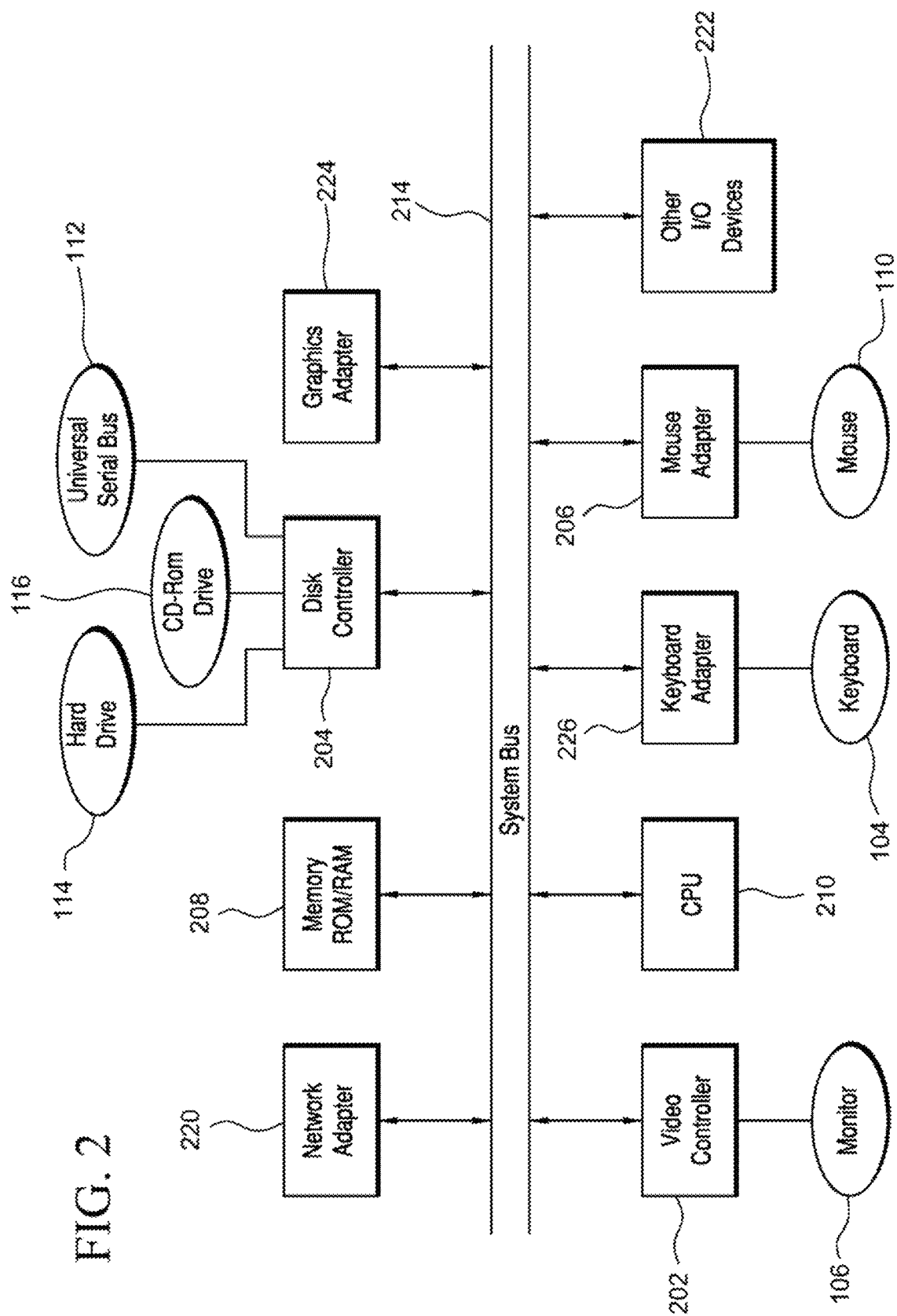
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
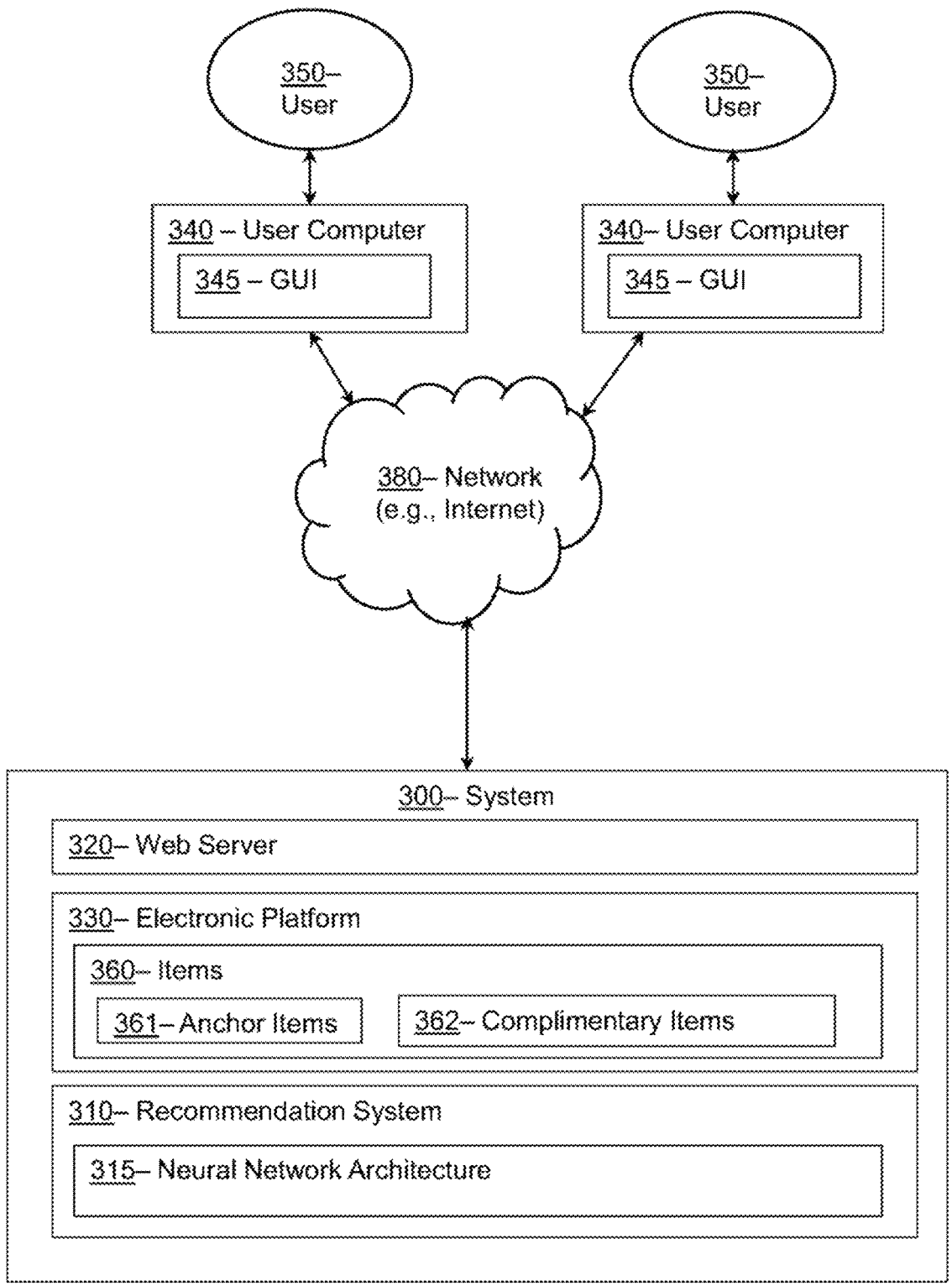
FIG. 3 illustrates a representative block diagram of a system according to certain embodiments.

Turning ahead in the drawings, FIG. 3 illustrates a block diagram of a system 300 that can be employed for generating, determining, and/or identifying recommendations for items (e.g., accessory items and/or other types of items), as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a recommendation system 310, a neural network architecture 315, a web server 320, and an electronic platform 330. The recommendation system 310, neural network architecture 315, web server 320, and electronic platform 330 can each be a separate computer system, such as computer system 100 (FIG. 1), as described above, and can each be a single computer, a single server, or a cluster or collection of computers or servers, or a cloud of computers or servers. In another embodiment, a single computer system can host each of two or more of the recommendation system 310, neural network architecture 315, web server 320, and electronic platform 330. Additional details regarding the recommendation system 310, neural network architecture 315, web server 320, and electronic platform 330 are described herein.

In many embodiments, system 300 also can comprise user computers 340. In other embodiments, user computers 340 can be external to system 300. User computers 340 can comprise any of the elements described in relation to computer system 100. In some embodiments, user computers 340 can be mobile devices. A mobile device can refer to a portable electronic device (e.g., an electronic device easily conveyable by hand by a person of average size) with the capability to present audio and/or visual data (e.g., text, images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile device, and vice versa. However, a wearable user computer device does not necessarily comprise a mobile device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100 (FIG. 1), user computers 340, and/or server computers associated with implementing system 300. In the same or different embodiments, GUIs 345 can comprise a website accessed through network 380 (e.g., the Internet). In some embodiments, GUIs 345 can comprise an eCommerce website. In the same or different embodiments, GUIs 345 can be displayed as or on a virtual reality (VR) and/or augmented reality (AR) system or display.

In some embodiments, web server 320 can be in data communication through network 380 (e.g., the Internet) with user computers (e.g., user computers 340). In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, recommendation system 310, neural network architecture 315, web server 320, and electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of recommendation system 310, neural network architecture 315, web server 320, and/or electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the recommendation system 310, neural network architecture 315, web server 320, and/or electronic platform 330. In a similar manner, the processing module(s) and the memory storage module(s) can be local and/or remote to each other.

In many embodiments, the recommendation system 310, neural network architecture 315, web server 320, and/or electronic platform 330 can be configured to communicate with one or more user computers 340. In some embodiments, user computers 340 also can be referred to as customer computers. In some embodiments, the recommendation system 310, neural network architecture 315, web server 320, and/or electronic platform 330 can communicate or interface (e.g., interact) with one or more customer computers (such as user computers 340) through a network 380 (e.g., the Internet). Network 380 can be an intranet that is not open to the public. Accordingly, in many embodiments, the recommendation system 310, neural network architecture 315, web server 320, and/or electronic platform 330 (and/or the software used by such systems) can refer to a back end of system 300 operated by an operator and/or administrator of system 300, and user computers 340 (and/or the software used by such systems) can refer to a front end of system 300 used by one or more users 350, respectively. In some embodiments, users 350 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the recommendation system 310, neural network architecture 315, web server 320, and/or electronic platform 330 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between the recommendation system 310, neural network architecture 315, web server 320, and/or electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 350 may operate user computers 340 to browse, view, purchase, and/or order items 360 via the electronic platform 330. For example, the electronic platform 330 may include an eCommerce website that enables users 350 to add items 360 to a digital shopping cart and to purchase the added items 360. The items 360 made available via the electronic platform 330 may generally relate to any type of product and/or service including, but not limited to, products and/or services associated with entertainment, furniture, apparel, kitchenware, fashion, etc.

In certain embodiments, the recommendation system 310 may recommend and/or suggest items 360 to the users 350 while they are accessing or interacting with the electronic platform 330. For example, in response to a user 350 adding an item 360 to a digital shopping cart, the recommendation system 310 may identify and display recommendations for other items 360 to the user 360 on an interface confirming the item 360 has been added to a digital shopping cart. The recommendation system 310 also may display recommendations for items 360 on a checkout interface, shopping cart interface, recommendations interface, and/or other interface that is accessible via the electronic platform 330. In some cases, the recommendations may correspond to complementary items, substitute items, similar items, items offered by particular retailers or manufacturers, etc. The recommendation system 310 can identify and display recommendations for items 360 in many other scenarios as well.

In certain embodiments, the recommendation system 310 can be configured to perform specialized functions for recommending complementary items 362 associated with anchor items 361. Generally speaking, an anchor item 361 may correspond to an item that has been identified by a user 350 in some manner. For example, an anchor item 361 may represent an item 360 that has been added to a digital shopping cart. Additionally, or alternatively, an anchor item 361 may represent an item 360 that has been viewed by the user 350 on the electronic platform 330, an item 360 that is included on a checkout interface, an item 360 that has been added to a list (e.g., a shopping list or favorites list) by the user 350, and/or other item that is identified by the user 350.

For each anchor item 361, the recommendation system 310 may identify and display one or more complementary items 362. Generally speaking, a complementary item 362 may correspond to an item that can be paired or used in conjunction with the anchor item 361 in some manner, or an item 360 that is commonly purchased with the anchor item 361. For example, a complementary item 362 may represent an accessory that is associated with an anchor item 361. Depending upon the type of anchor item 361, a complementary item 362 may represent an item 360 that supplements the functionality, appearance, and/or aspect of the anchor item 361.

The types of complementary items 362 can vary greatly based on the type of anchor item 361 that is identified, and can include both products and services. For example, in response to a user 350 identifying an anchor item 361 corresponding to a cell phone, the recommendation system 310 may identify and display complementary items 362 corresponding to phone chargers, protective cases, head phones, cell phone service or warranty plans, etc. In another example, in response to a user 350 identifying an anchor item 361 corresponding to dishware, the recommendation system 310 may identify and display complementary items 362 corresponding to knives, forks, pots, pans, etc. In a further example, in response to a user 350 identifying an anchor item 361 corresponding to a table, the recommendation system 310 may identify and display complementary items 362 corresponding furniture assembly services, chairs, rugs, etc.

As explained throughout this disclosure, the recommendation system 310 may execute specialized functions for identifying and recommending complementary items 362 corresponding to anchor items 361. The recommendations provided by the recommendation system 310 may identify complimentary items 362 that are highly relevant and customized for each user 350.

In certain embodiments, the recommendation system 310 may include a neural network architecture 315 that is trained to perform various functions associated with the identifying and recommending complimentary items 362. For example, in certain embodiments, the neural network architecture 315 can be trained to identify item types or categories of complementary items 362 for identified anchor items 361. The neural network architecture 315 also can be trained to rank and score potential complementary items 362 associated with the identified item types or categories. The neural network architecture 315 further can be trained to customize or personalize the ranking and scoring of the potential complementary items 362 based on user profiles of customers. The neural network architecture 315 can be trained to perform additional functions associated with identifying and presenting complimentary items 362 as well. In certain embodiments, the neural network architecture 315 can be trained to perform these and other machine learning functions using any supervised, semi-supervised, and/or unsupervised training procedure.

The configuration of the neural network architecture 315 can vary. The neural network architecture 315 can include one or more artificial neural networks that are configured to execute deep learning functions artificial intelligence functions, and/or machine learning functions to perform the functions described herein. Each artificial neural network may include a plurality of layers including, but not limited to, one or more input layers, one or more output layers, one or more hidden layers, one or more ReLU (rectifier linear unit) layers, one or more pooling layers, one or more fully connected layers, one or more normalization layers, one or more activation layers, etc. Exemplary configurations of the neural network architecture 315 are discussed in further detail below.

The complementary items 362 identified by the recommendation system 310 for a corresponding anchor item 361 can be transmitted over the network 380 for display on one or more user computers 340. The complementary items 362 and corresponding anchor item 361 may be displayed together on the same GUI 345. The complementary items 362 may be displayed with options that enable users 350 to purchase the complementary items 362 and/or add the complementary items 362 to a digital shopping cart.

Figure 4:
FIG. 4 illustrates a representative block diagram of a portion of the system of FIG. 3 according to certain embodiments.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing a recommendation system 310, web server 320, and electronic platform 330. The one or more processing modules 402 are configured to execute instructions associated with these components. Exemplary configurations for each of these components are described in further detail below.

The exemplary electronic platform 330 of system 300 includes one or more databases 410. The one or more databases 410 store data and information related to items 360 (e.g., products and/or services) that are offered or made available via the electronic platform 330. For example, for each item 360, the data and information may include any or all of the following: an item name or title, an item category associated with the item, one or more customer ratings for the item, an item description, a sale price, images corresponding to the item, a number of total sales, other items that were purchased simultaneously with the item, and various other data associated with the item. Some or all of this information may be stored in a separate item profile 412 for each item 360. In some cases, the item profile 412 may be generated, at least in part, by analyzing aggregated transaction data stored on the electronic platform 330.

The one or more databases 410 may also store user profiles 411 associated with users 350 (FIG. 3) who access the electronic platform 330. Each user profile 411 can include various data and information associated with a particular user 350 (FIG. 3). For example, for each user 350 (FIG. 3), an exemplary user profile 411 may store data and information including a name, customer identifier ("ID"), transaction or purchase history, demographic information (e.g., indicating gender, age, race, ethnicity, etc.), price sensitivity information (e.g., indicating average price range of items purchased by users), brands commonly purchased by user 350 (FIG. 3), and various other information associated with the user 350 (FIG. 3) and/or the user's interaction with the electronic platform 330.

The recommendation system 310 and/or neural network architecture 315 may utilize the information stored in the one or more databases 410 in various ways to recommend items 360 to users 350 (FIG. 3) accessing the electronic platform 330 as described herein.

As mentioned above, the recommendation system 310 can include a neural network architecture 315 that can execute various functions to assisting with providing item recommendations. In certain embodiments, the neural network architecture 315 may include a quadruplet network 420, ranking network 430, and re-ranking network 440 that execute functions associated with providing recommendations, including recommendations identifying complimentary items 362. Exemplary details and configurations for the quadruplet network 420, ranking network 430, and re-ranking network 440 are described below.

The quadruplet network 420 may represent an artificial neural network that is trained to identify one or more item categories 421 for each anchor item 361 that is received by the quadruplet network 420. For example, in response to receiving an anchor item 361 as an input, the quadruplet network 420 can generate an output identifying one or more complimentary item categories 421 corresponding to the anchor item 361. Generally speaking each item category 421 may represent an item type or category of items that comprises complimentary items 362 corresponding to the anchor item 361. The item categories 421 may be used to identify complementary items 362 that are commonly purchased with a corresponding anchor item 351. For example, in response to receiving an anchor item 361 corresponding to a television, the quadruplet network 420 may identify complimentary item categories 421 corresponding to television remote controls, audio systems for televisions, service or warranty plans, etc. These complimentary item categories 421 may then be used to identify specific complementary items 362 corresponding to the anchor item 361.

Exemplary configurations and training procedures for the quadruplet network 420 are described in U.S. patent application Ser. No. 16/779,133 filed on Jan. 31, 2020, which is incorporated by reference in its entirety as if recited in full herein. As explained therein, certain embodiments of the quadruplet network 420 may include a text encoder 422, e.g., such as the Google Universal Sentence Encoder ("GUSE") and/or other similar encoder. The text encoder 422 can include a neural network structure that is configured to generate vector information based on textual information associated with the anchor items 361. The vector information can then be utilized to identify one or more complimentary item categories 421 for each of the anchor items 361.

In certain embodiments, the quadruplet network 420 may be trained, at least in part, using a training dataset comprising item quadruplets (e.g., including anchor items, complimentary items, similar items, and negative items). In certain embodiments, the quadruplet network 420 can be trained to distinguish between complimentary items 362 (e.g., which can include items that compliment or supplement the functionality, appearance, and/or other aspect of the anchor item 361 and/or which are commonly purchased together with the anchor item 361), and similar items (e.g., which include alternative items for the corresponding anchor item 361). The quadruplet network 420 also can be trained to distinguish between complimentary items 362 and negative items (e.g., which include items that are unrelated to the anchor item 361 and/or not commonly purchased with the anchor item 361).

The quadruplet network 420 may be utilized to identify the most relevant item categories 421. For example, in certain embodiments, the quadruplet network 420 may identify a pre-determined number (e.g., ten) of most relevant item categories 421 based on scores derived using the vector information associated with an anchor item 361. For each item category 421 that is identified by quadruplet network 420, the recommendation system 310 can identify complimentary items 362 associated with the complimentary item category 421.

The ranking network 430 is configured to identify the most relevant complimentary items 362 in each of the complimentary item categories 421 identified by the quadruplet network 420. In certain embodiments, the ranking network 430 may generate scores 435 for the complimentary items 362 in each of the complimentary item categories 421, and the scores 435 may be utilized to identify the most relevant complimentary items 362 in each complimentary item category 421. Each score may indicate a distance measure between a complimentary item 362 and an anchor item 361. For each complimentary item 362, the ranking network 430 may derive dense features 432, categorical features 433, and continuous features 434 for the complimentary item 362, and this feature information may be utilized to calculate the score 435 for the complimentary item 362. The configuration of the ranking network 430 can vary.

Figure 5:
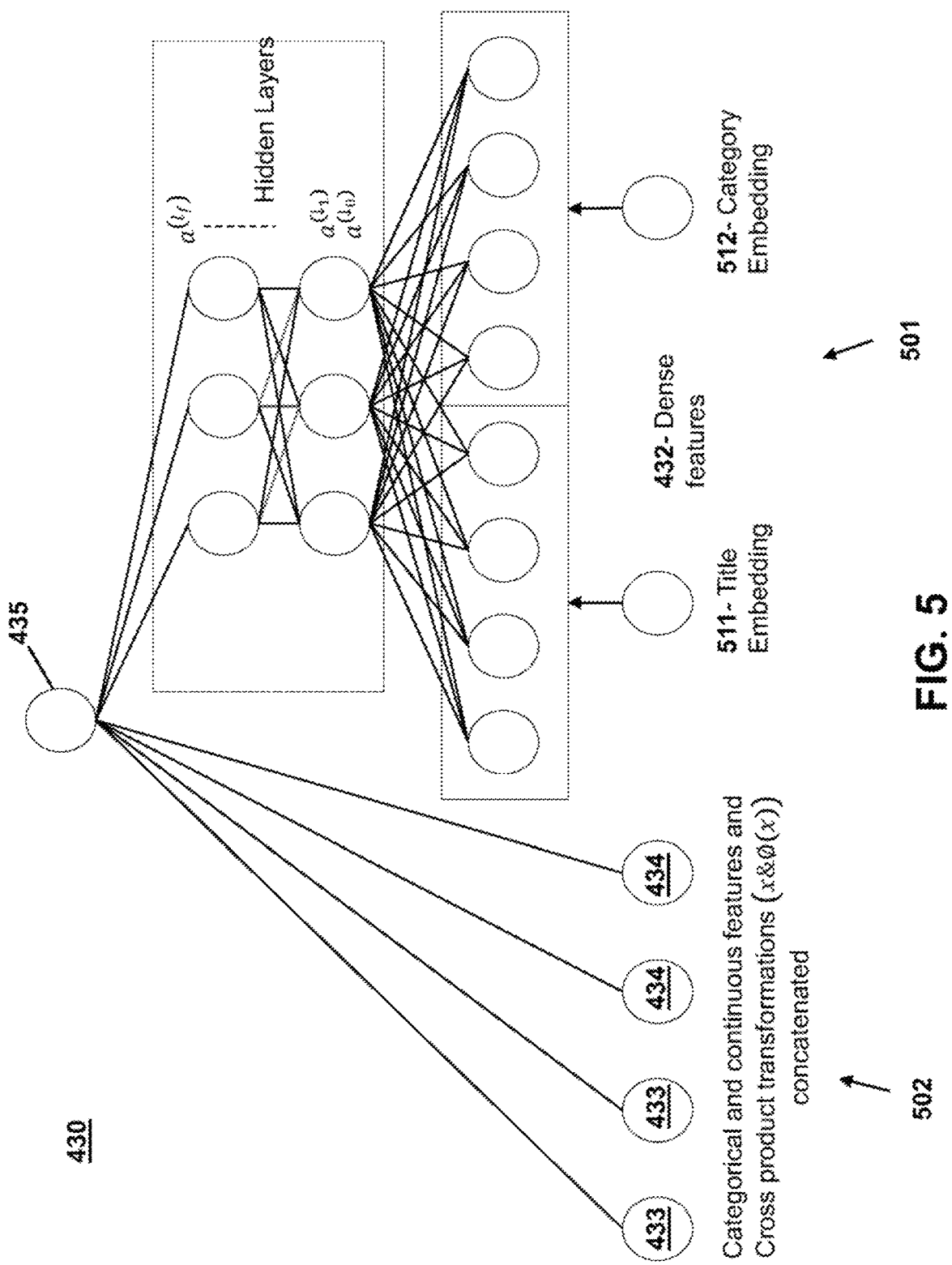
FIG. 5 is an exemplary architecture for a ranking network according to certain embodiments.

FIG. 5 discloses an exemplary architecture for a ranking network 430 according to certain embodiments. The architecture includes a deep network 501 (right side) and a wide network 502 (left side). The deep network 501 receives inputs including dense features 432. The wide network 502 receives inputs including categorical features 433 and continuous features 434. The wide network 502 receives inputs including concatenated product transformations of the categorical features 433 and continuous features 434. The outputs of the wide network and deep network are combined to produce a score 435 for a complimentary item 362 (FIGS. 3 & 4).

The dense features 432 can include title embeddings 511 and category embeddings 512 that are generated based on the title of the complimentary item 362 (FIGS. 3 & 4) and the category associated with the complimentary item 362 (FIGS. 3 & 4). These dense features 432 can be generated by a text encoder 422 (FIG. 4), e.g., such as GUSE and/or other similar encoder. Generally speaking, the title embeddings 511 and category embeddings 512 can be utilized by the ranking network 430 to determine how closely related a complimentary item 362 (FIGS. 3 & 4) is to a corresponding anchor item 361 (FIGS. 3 & 4) based on title and category information.

Returning to FIG. 4, the categorical features 433 can include one or more embeddings and/or vectors indicating the closeness or similarity of a complimentary item 362 to a corresponding anchor item 361 based on any or all of the following factors: a) whether the complimentary item 362 and anchor item 361 are the same brand; b) whether the complimentary item 362 and anchor item 361 are categorized in the same hierarchical level (e.g., the electronic platform 330 may categorize items in a hierarchy of levels and two items in the same level may be more closely related than items that are not in the same level); whether the expected age demographics of the complimentary item 362 and anchor item 361 match; whether the expected gender demographic of the complimentary item 362 and anchor item 361 match; and/or whether the styles of the of the complimentary item 362 and anchor item 361 match. Generally speaking, the categorical features 433 can be utilized by the ranking network 430 to determine how closely related a complimentary item 362 is to a corresponding anchor item 361 based on any or all of the aforementioned features and/or other categorical features.

The continuous features 434 can include one or more embeddings and/or vectors indicating the closeness or similarity of a complimentary item 362 to a corresponding anchor item 361 based, at least in part, on transaction information that can be continuously updated, such as any or all of the following: a) co-purchases within a particular time period (e.g., indicating how often the complimentary item 362 and anchor item 361 have been purchased together in the previous six months); b) co-views within a particular time period (e.g., indicating how often the complimentary item 362 and anchor item 361 were both viewed on the electronic platform 330 by a customer during a single session within the previous six months); c) customer rating information (e.g. indicating customer's liking on scale of 1 to 5 for the candidate complementary item 362); and d) title similarity between anchor item and candidate complementary item (e.g., which may be determined by comparing the Euclidean distance between embeddings generated for the anchor item and candidate complementary item).

In certain embodiments, the ranking network 430 can generate a score 435 for each complimentary item 362 based on some or all of the dense features 432, categorical features 433, and continuous features 434 mentioned above. For example, in certain embodiments, the ranking network 430 may generate the scores 435 according to the following equation:

$$P(Y=1) = \sigma(w_{wide}^T [x, \varnothing(x)] + w_{deep}^T a^{(l_f)} + b) \qquad (1)$$

where:
$w_{wide}$: vector of all wide model weights;
$w_{deep}$: vector of model weights applied on final activation of deep network;
x: categorical and continuous features;
σ: Sigmoid function;
$a^{(l_f)}$: final activations;
∅(x): cross product transformations of the original features x;
b: Bias term; and
T: transpose operation.

After the scores 435 have been generated by for the complimentary items 362 associated with the item categories 421 identified by the quadruplet network 420, the recommendation system 310 can then determine the most relevant complimentary items 362 in each item category 421.

Continuing with FIG. 4, after the scores 435 are generated for the complimentary items 362 in each category, the complimentary items 362 in each item category 421 can be ordered to produce ranking results 431. The ranking results 431 may indicate an ordering of the complimentary items 362 based on their closeness to a corresponding anchor item 361. The ranking results 431 enable the recommendation system 310 to easily identify the complimentary items 362 in each item category 421 that are most relevant to the corresponding anchor item 361 and/or which have the shortest distance measures to the corresponding anchor item 361.

After the initial ranking and scoring functions are performed by the ranking network 430, the recommendation system 310 may determine whether or not a user profile 411 exists or is available for the user who has identified the anchor item 361 (e.g., the user who identified the anchor item 361 by adding it to a digital shopping cart or by viewing a web page that provides details above the anchor item 361). If a user profile 411 does not exist or is not available, the recommendation system 310 may select one or more of the complimentary items 362 based on the ranking results 431, and transmit the one or more of the complimentary items 362 to the user for output on a computer device being operated by the user.

On the other hand, if the recommendation system 310 determines that a user profile 411 does exist or is available, the re-ranking network 440 can utilize the user profile 411 to customize or personalize the complimentary items 362 that are displayed to the user. Thus, before any complimentary items 362 are output as recommendations to the user, the re-ranking network 440 can utilize the user profile 411 to update the scores 435 and ranking results 431 associated with the complimentary items 362 to further customize the recommendations.

The configuration of the re-ranking network 440 can vary. In certain embodiments, the re-ranking network 440 customizes the recommendations for complimentary items 362 by comparing a user profile embedding 441 derived from a user profile 411 to item profile embeddings 442 derived from item profiles 412 associated with the complimentary items 362. This comparison can enable recommendations to be customized based on any or all of the following: price sensitivity information (e.g., based on whether the complimentary items 362 match, or are similar to, the user's spending patterns); brand information (e.g., based on whether the complimentary items 362 are offered by brands typically purchased by the user); age information (e.g., based on whether the complimentary items 362 are typically purchased by the age demographic associated with the user);

and gender information (e.g., based on whether the complimentary items 362 are typically purchased by the gender of the user). This comparison can enable recommendations to be customized in other ways as well. The re-ranking network 440 can utilize this comparison information to update the scores 435 and ranking results 431 associated with the complimentary items 362.

Figure 6:
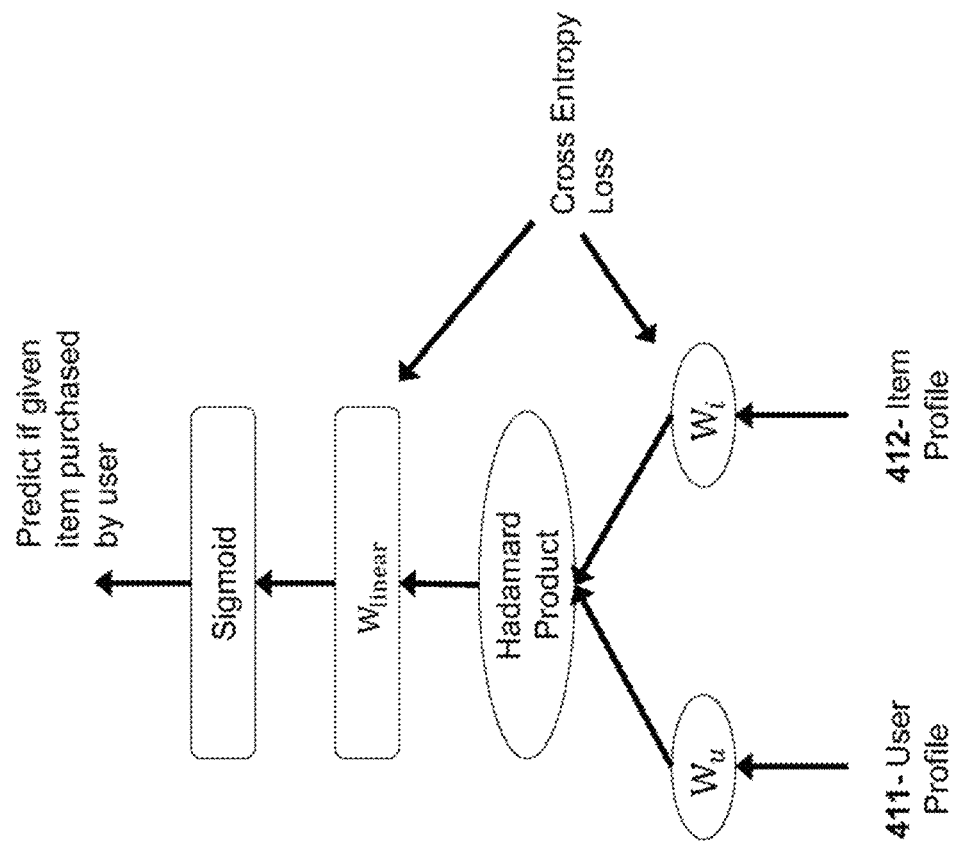
FIG. 6 is an exemplary architecture for a re-ranking network according to certain embodiments.

FIG. 6 discloses an exemplary architecture for a re-ranking network 440 according to certain embodiments. A pair of weighting layers apply initial weights ($W_u$ and $W_i$) to a user profile embedding 441 corresponding to a user profile of a user and an item profile embedding 442 corresponding to an item profile of candidate complimentary item 362. The weighting layers output equal-length sequences of numbers or coordinate vectors, and a Hadamard product operation is performed on the outputs. After an additional weighting layer applies a weight ($W_{linear}$) to the output of the Hadamard product operation, a sigmoid probability function predicts whether or the item corresponding to the item profile embedding 442 will be, or is likely to be, purchased by the user corresponding to the user profile embedding 441.

In certain embodiments, the sigmoid probability function may be implemented according to the following:

$$P(r=1) = \frac{1}{1 + \exp(W_{linear}((W_u^T x_u) \circ (W_i^T x_i)))} \quad (2)$$

where:
P(r): the predicted probability that user purchases the candidate complimentary item, such that r=1 if the user is predicted to purchase the candidate complimentary item and r=0 if the user is not predicted to purchase the candidate complimentary item;
$x_u$: user profile at index u;
$x_i$: item profile at index i; and
exp: Exponent operator.

The re-ranking network 440 may execute a training procedure that is utilized to train the values of the weights ($W_u$, $W_i$, and $W_{linear}$) included in the weighting layers. The weights ($W_u$, $W_i$, $W_{linear}$) can trained in an end-to-end by back propagation using classical variants of stochastic gradient descent (SGD). In certain embodiments, the weights may be trained using a cross-entropy loss according to the following:

$$L = r \log P(r) + (1-r) \log(1-P(r)) \quad (3)$$

where L is the cross-entropy loss. During training, user-item profile pair corresponding to r=1 is generated by using item profiles for the items that user has previously purchased. A user-item profile pair corresponding to r=0 is generated by randomly sampling items that user has not previously purchased.

Figure 7:
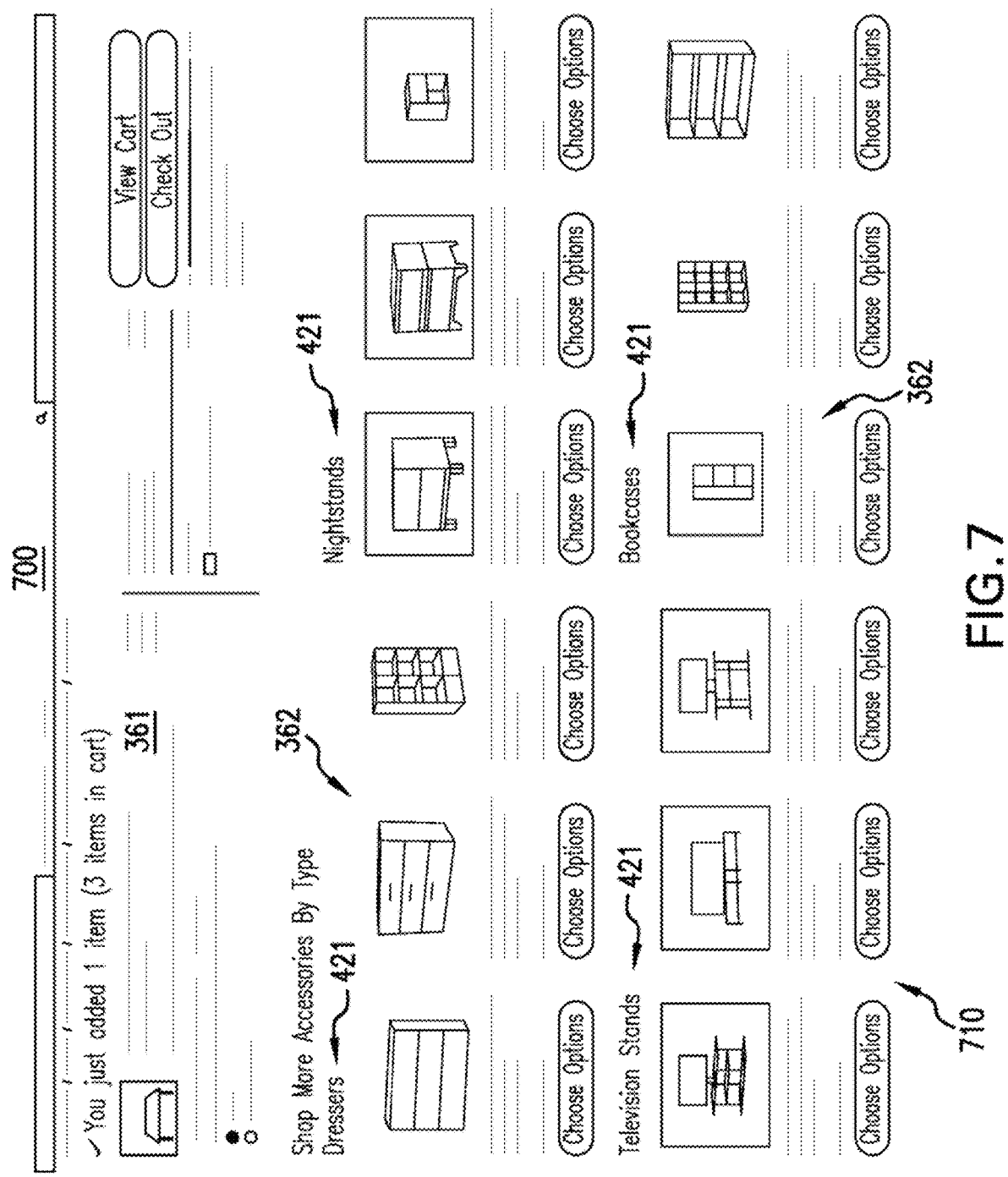
FIG. 7 illustrates an exemplary interface according to certain embodiments.

FIG. 7 illustrates an exemplary interface 700 that includes a recommendation section 710 comprising recommended complimentary items 362 identified by the recommendation system 310 (FIGS. 3 & 4). Specifically, the interface 700 displays complimentary items 362 in the four most relevant item categories 421, and the three most relevant complimentary items 362 are selected for display in each item category 421.

Figure 8:
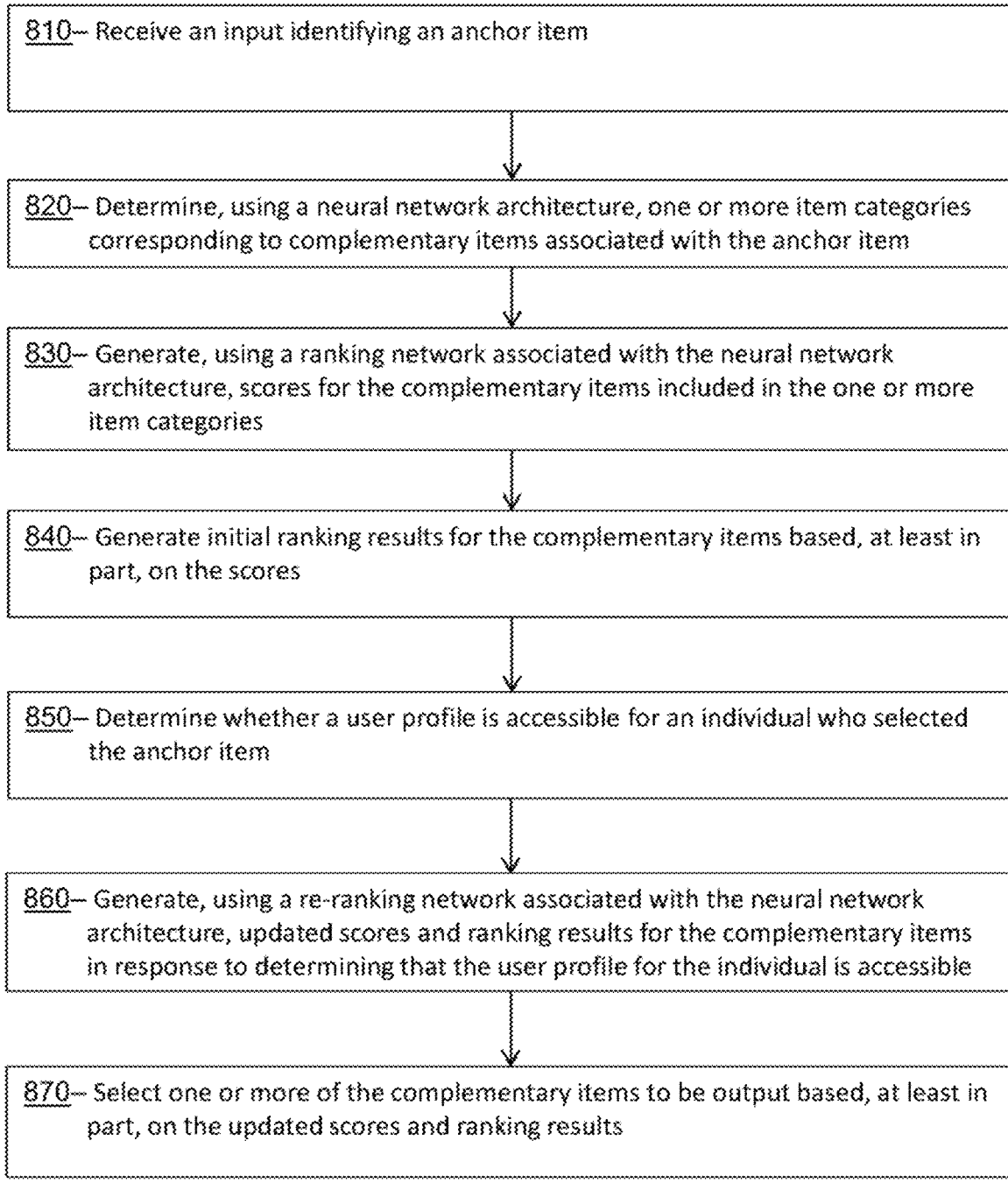
FIG. 8 illustrates a flowchart for an exemplary method according to certain embodiments.

FIG. 8 illustrates a flow chart for an exemplary method 800, according to certain embodiments. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIGS. 3-4) and/or recommendation system 310 (FIGS. 3-4) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as system 300 (FIG. 3), recommendation system 310 (FIG. 3), and/or electronic platform 330 (FIG. 3). The processing module(s) can be similar or identical to the processing module(s) described above with respect to computer system 100 (FIG. 1).

In many embodiments, method 800 can comprise an activity 810 of receive an input identifying an anchor item.

Method 800 can further comprise an activity 820 of determining, using a neural network architecture, one or more item categories corresponding to complementary items associated with the anchor item.

Method 800 can further comprise an activity 830 of generating, using a ranking network associated with the neural network architecture, scores for the complementary items included in the one or more item categories.

Method 800 can further comprise an activity 840 of generating, using the ranking network associated with the neural network architecture, initial ranking results for the complementary items based, at least in part, on the scores.

Method 800 can further comprise an activity 850 of determining whether a user profile is accessible for an individual who selected the anchor item.

Method 800 can further comprise an activity 860 of generating, using a re-ranking network associated with the neural network architecture, updated scores and ranking results for the complementary items in response to determining that the user profile for the individual is accessible Method 800 can further comprise an activity 870 of selecting one or more of the complementary items to be output based, at least in part, on the updated scores and ranking results.

As evidenced by the disclosure herein, the techniques set forth in this disclosure are rooted in computer technologies that overcome existing problems in known recommendation systems, specifically problems dealing with providing accurate and relevant recommendations for complimentary items. The techniques described in this disclosure provide a technical solution (e.g., one that utilizes various AI-based neural networking and/or machine learning techniques) for overcoming the limitations associated with known techniques. For example, the item recommendation techniques described herein take advantage of novel AI and machine learning techniques to learn functions for determining relevant item categories, ranking candidate item recommendations, and customizing recommendations based on user profiles. This technology-based solution marks an improvement over existing capabilities and functionalities related to computer systems by improving the accuracy and quality of the recommendations, and doing so in an efficient manner that enables item recommendations to be provided in large datasets.

In certain embodiments, the techniques described herein can advantageously improve user experiences with electronic platforms by quickly identifying highly relevant item recommendations within large datasets. In various embodiments, the techniques described herein can be executed dynamically in real time as a user accesses interfaces provided by an electronic platform. In many embodiments, the techniques described herein can be used continuously at a scale that cannot be reasonably performed using manual techniques or the human mind (e.g., due to the large number of items that are made available via an electronic platform).

In many embodiments, the techniques described herein can be used continuously at a scale that cannot be reasonably performed using manual techniques or the human mind. For example, the data analyzed by the neural networks and machine learning techniques described herein can be too large to be analyzed using manual techniques.

Furthermore, in a number of embodiments, the techniques described herein can solve a technical problem that arises only within the realm of computer networks, because neural networks and machine learning do not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 8 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for recommending complementary items comprising:
   one or more processors; and
   one or more non-transitory computer-readable storage devices storing computing instructions configured to run on the one or more processors and perform:
   receiving an input identifying an anchor item;
   determining, using a quadruplet network associated with a neural network architecture, one or more item categories corresponding to the complementary items associated with the anchor item;
   generating, using a ranking network associated with the neural network architecture, scores for the complementary items included in the one or more item categories;
   generating, using the ranking network associated with the neural network architecture, first ranking results for the complementary items based, at least in part, on the scores; and
   selecting one or more of the complementary items to be displayed based, at least in part, on the first ranking results.

2. The system of claim 1, wherein the computing instructions are further configured to run on the one or more processors and perform:
   determining whether a user profile is accessible for an individual who selected the anchor item;
   in response to determining that the user profile for the individual is accessible, updating the scores for the complementary items using a re-ranking network associated with the neural network architecture; and
   updating the first ranking results to create second ranking results for the complementary items based on the scores that are updated by the re-ranking network.

3. The system of claim 2, wherein the one or more complementary items are selected to be displayed based, at least in part, on the second ranking results updated by the re-ranking network.

4. The system of claim 2, wherein generating the second ranking results comprises:
   generating, using the re-ranking network of the neural network architecture, a user profile embedding corresponding to the user profile;
   generating, using the re-ranking network of the neural network architecture, item profile embeddings for the complementary items associated with the second ranking results; and
   using the user profile embedding and item profile embeddings to update the scores.

5. The system of claim 1, wherein generating the first ranking results comprises:
   generating, using a text encoder associated with the neural network architecture, dense features comprising title embeddings and category embeddings corresponding to the complementary items; and
   generating the first ranking results based, at least in part, on the dense features.

6. The system of claim 5, wherein generating the first ranking results further comprises:
   generating categorical features associated with the complementary items;
   generating continuous features associated with the complementary items; and
   generating the first ranking results based, at least in part, on the dense features, the categorical features, and the continuous features.

7. The system of claim 1, wherein the anchor item and the one or more complementary items are accessible via an electronic platform over a network.

8. The system of claim 1, wherein the computing instructions are further configured to run on the one or more processors and perform:
   determining whether a user profile is accessible for an individual who selected the anchor item; and
   in response to determining that the user profile for the individual is accessible, customizing the first ranking results based, at least in part, on the user profile.

9. A method for recommending complementary items implemented via execution of computing instructions configured to run at one or more processors and configured to be stored at non-transitory computer-readable media, the method comprising:

receiving an input identifying an anchor item;

determining, using a quadruplet network associated with a neural network architecture, one or more item categories corresponding to the complementary items associated with the anchor item;

generating, using a ranking network associated with the neural network architecture, scores for the complementary items included in the one or more item categories;

generating, using the ranking network associated with the neural network architecture, first ranking results for the complementary items based, at least in part, on the scores; and selecting one or more of the complementary items to be displayed based, at least in part, on the first ranking results.

10. The method of claim 9 further comprising:

determining whether a user profile is accessible for an individual who selected the anchor item;

in response to determining that the user profile for the individual is accessible, updating the scores for the complementary items using a re-ranking network associated with the neural network architecture; and updating the first ranking results to create second ranking results for the complementary items based on the scores that are updated by the re-ranking network.

11. The method of claim 10, wherein the one or more complementary items are selected to be displayed based, at least in part, on the second ranking results updated by the re-ranking network.

12. The method of claim 10, wherein generating the second ranking results comprises:

generating, using the re-ranking network of the neural network architecture, a user profile embedding corresponding to the user profile;

generating, using the re-ranking network of the neural network architecture, item profile embeddings for the complementary items associated with the second ranking results; and using the user profile embedding and item profile embeddings to update the scores.

13. The method of claim 9, wherein generating the first ranking results comprises:

generating, using a text encoder associated with the neural network architecture, dense features comprising title embeddings and category embeddings corresponding to the complementary items; and generating the first ranking results based, at least in part, on the dense features.

14. The method of claim 13, wherein generating the first ranking results further comprises:

generating categorical features associated with the complementary items;

generating continuous features associated with the complementary items; and generating the first ranking results based, at least in part, on the dense features, the categorical features, and the continuous features.

15. The method of claim 9, wherein the anchor item and the one or more complementary items are accessible via an electronic platform over a network.

16. The method of claim 9 further comprising:

determining whether a user profile is accessible for an individual who selected the anchor item; and in response to determining that the user profile for the individual is accessible, customizing the first ranking results based, at least in part, on the user profile.

17. A computer program product for recommending complementary items, the computer program product comprising a non-transitory computer-readable medium including instructions for causing a computer to:

receive an input identifying an anchor item;

determine, using a quadruplet network associated with a neural network architecture, one or more item categories corresponding to the complementary items associated with the anchor item;

generate, using a ranking network associated with the neural network architecture, scores for the complementary items included in the one or more item categories;

generate, using the ranking network associated with the neural network architecture, first ranking results for the complementary items based, at least in part, on the scores; and select one or more of the complementary items to be displayed based, at least in part, on the first ranking results.

18. The computer program product of claim 17, wherein the instructions further cause the computer to:

determine whether a user profile is accessible for an individual who selected the anchor item;

in response to determining that the user profile for the individual is accessible, update the scores for the complementary items using a re-ranking network associated with the neural network architecture; and update the first ranking results to create second ranking results for the complementary items based on the scores that are updated by the re-ranking network.

19. The computer program product of claim 18, wherein the one or more complementary items are selected to be displayed based, at least in part, on the second ranking results updated by the re-ranking network.

20. The computer program product of claim 18, wherein generating the second ranking results comprises:

generating, using the re-ranking network of the neural network architecture, a user profile embedding corresponding to the user profile;

generating, using the re-ranking network of the neural network architecture, item profile embeddings for the complementary items associated with the second ranking results; and using the user profile embedding and item profile embeddings to update the scores.

* * * * *